(12) United States Patent
Duenner et al.

(10) Patent No.: US 11,301,776 B2
(45) Date of Patent: Apr. 12, 2022

(54) MEMORY-BASED DATA SELECTION SCHEME FOR MACHINE LEARNING TRAINING ON LIMITED MEMORY RESOURCES

(71) Applicant: International Business Machines Corporation, Armonk, NY (US)

(72) Inventors: Celestine Duenner, Wettswil (CH); Thomas P. Parnell, Zurich (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 15/953,440

(22) Filed: Apr. 14, 2018

(65) Prior Publication Data
US 2019/0318270 A1 Oct. 17, 2019

(51) Int. Cl.
| G06F 15/16 | (2006.01) |
| G06F 9/54 | (2006.01) |
| H04L 29/06 | (2006.01) |
| G06N 20/00 | (2019.01) |
| G06F 9/50 | (2006.01) |

(52) U.S. Cl.
CPC .......... *G06N 20/00* (2019.01); *G06F 9/5016* (2013.01)

(58) Field of Classification Search
CPC .................................................. G06F 9/2016
USPC ......................................................... 706/12
See application file for complete search history.

(56) References Cited

U.S. PATENT DOCUMENTS

| 8,468,109 B2 * | 6/2013 | Moussa .................. G06N 3/063 706/31 |
| 9,454,733 B1 | 9/2016 | Purpura et al. |
| 11,210,140 B1 * | 12/2021 | Gold ..................... G06F 3/0649 |

(Continued)

FOREIGN PATENT DOCUMENTS

| WO | WO-2011162628 A2 * | 12/2011 | ............. G06F 8/314 |
| WO | WO-2018212826 A1 * | 11/2018 | ............... G06T 1/20 |

OTHER PUBLICATIONS

Chang, K.-W., et al., "Selective Block Minimization for Faster Convergence of Limited Memory Large-Scale Linear Models", KDD'11, Aug. 21-24, 2011, 9 pages.

(Continued)

*Primary Examiner* — Hamza N Algibhah
(74) *Attorney, Agent, or Firm* — Scully, Scott, Murphy & Presser, P.C.; Daniel P. Morris

(57) ABSTRACT

A method for a machine learning model training is provided which operates in a mixed CPU/GPU environment. The amount of general processing unit memory is larger than the amount of special processing unit memory. The method includes loading a complete training data set into the memory of the general processing unit, determining importance values relating to training data vectors in the provided training data set of the training data vectors, dynamically transferring training data vectors of the training data set from the general processing unit memory to a special processing unit memory using as decision criteria the importance value of the training data vector, wherein the importance value used is taken from an earlier training round of the machine learning model, and executing a training algorithm on the special processing unit with the training data vectors having the highest available importance values of one of the earlier training rounds.

20 Claims, 6 Drawing Sheets

(56) References Cited

U.S. PATENT DOCUMENTS

| | | | |
|---|---|---|---|
| 2004/0190617 A1* | 9/2004 | Shen | H04N 19/159 375/240.16 |
| 2012/0233486 A1* | 9/2012 | Phull | G06F 9/5083 713/375 |
| 2016/0205697 A1* | 7/2016 | Tan | H04W 24/02 370/329 |
| 2017/0024849 A1 | 1/2017 | Ming-Chang et al. | |
| 2018/0210830 A1* | 7/2018 | Malladi | G06F 12/0866 |
| 2019/0086988 A1* | 3/2019 | He | G06N 20/00 |
| 2019/0188560 A1* | 6/2019 | Le | G06N 3/063 |
| 2019/0318270 A1* | 10/2019 | Duenner | G06F 9/5016 |
| 2021/0312811 A1* | 10/2021 | Ohlarik | G06N 5/04 |

OTHER PUBLICATIONS

Gepperth, A., et al., "Incremental learning algorithms and applications", ESANN 2016 proceedings, European Symposium on Artificial Neural Networks, Computational Intelligence and Machine Learning, Apr. 27-29, 2016, pp. 357-368.

Dunner, C., et al., "Primal-Dual Rates and Certificates", arXiv:1602.05205v2, Jun. 2, 2016, Proceedings of the 33rd International Conference on Machine Learning, 2016, 23 pages, JMLR: W&CP vol. 48.

Perekrestenko, D., et al., "Faster Coordinate Descent via Adaptive Importance Sampling", http://arxiv.org/abs/1703.02518v1, Mar. 7, 2017, Proceedings of the 20th International Conference on Artificial Intelligence and Statistics (AISTATS) 2017, 9 pages, JMLR: W&CP vol. 54.

\* cited by examiner 102 loading a complete training data set to the general processing unit memory 104 determining importance values of data sample vectors 106 dynamically transferring data samples vectors of the training data set to the spec. proc. unit mem.

108 executing a training algorithm on the special processing unit

MEMORY-BASED DATA SELECTION SCHEME FOR MACHINE LEARNING TRAINING ON LIMITED MEMORY RESOURCES

FIELD OF THE INVENTION

The invention relates generally to a method for training of a machine learning model, and more specifically, a machine learning model training in a mixed environment comprising a general processing unit and a special processing unit. The invention relates further to a related system for training of a machine learning model, and a computer program product.

BACKGROUND

Today, cognitive computing—also known as machine learning—is en vogue. It enables traditional computers to tackle more complex tasks which are not programmed in a procedural way. Instead, a computer system is fed with training data and a base model to simulate the real world, i.e., achieving an approximation to the training data. This way, e.g., pattern matching techniques—like image recognition, voice recognition, and the like—may be implemented elegantly. Typically, powerful computer systems with a central processing unit (CPU) are used. In other cases, a combination of a system comprising a general processing unit and one or more graphic processing units (GPU) are used. In such a case, the training workload for the model is split between the general processing unit (often denoted as CPU) and one or more GPUs in order to reduce the time to train the model with the training data set.

Different methods to efficiently utilize available resources (CPU, GPU) approaches, like HetNet or HybNet, have been developed. In general, GPUs represent high-speed processing capabilities with a limited amount of memory, whereas CPUs have typically a broader construction set and access to a much larger amount of memory. Thus, a sophisticated method is required to split the model determination workload between the CPU and the GPU in a way to optimize the time consumed for the model development.

There are several disclosures related to a method for training of a machine learning model.

Document US 2017 0024849 A1 discloses learning of convolutional neural networks on heterogeneous CPU-CPU platforms. A HetNet approach separates batches into partitions, such that the GPU and CPU process separate batches.

Document U.S. Pat. No. 9,454,733 B1 discloses a method and a system for accelerating training of machine learning models using a limited-memory Bryden-Fletcher-Goldfarb-Shanno (L-BFGS) process, when the training data set size is more than the memory size.

A disadvantage of known solutions may be that either the CPU or the GPU has unused—and thus unproductive—idle times from time to time.

Hence, there may be a need to overcome the described waste of resources and allow a full parallel operation of the CPU and a GPU having only limited memory resources.

SUMMARY

According to one aspect of the present invention, a method for training of a machine learning model in a mixed environment comprising a general processing unit and a special processing unit may be provided. The amount of general processing unit memory directly accessible by the general processing unit may be larger than the amount of special processing unit memory directly accessible by the special processing unit. The method may comprise loading a complete training data set into the general processing unit memory, determining importance values relating to training data vectors in the provided training data set of the training data vectors, and dynamically transferring training data vectors of the training data set from the general processing unit memory to the special processing unit memory using as decision criteria the importance value of the training data vectors, wherein the importance value used is taken from an earlier training round for the machine learning model.

Additionally, the method may comprise executing a training algorithm on the special processing unit with the training data vectors having the highest available importance values of one of the earlier training rounds.

According to another aspect of the present invention, a system for training of a machine learning model may be provided. The system may comprise a general processing unit and a special processing unit. The amount of general processing unit memory, directly accessible by the general processing unit, may be larger than the amount of special processing unit memory directly accessible by the special processing unit. The system may comprise a loading unit adapted for loading a complete training data set into the memory of the general processing unit and an importance determination unit adapted for determining importance values relating to training data vectors in the provided training data set of the training data vectors.

Additionally, the system may comprise a transfer unit adapted for dynamically transferring training data vectors of the training data set from the general processing unit memory to a special processing unit memory using as decision criteria the importance value of the training data vector, wherein the importance value used is taken from an earlier training round of the machine learning model. The special processing unit may be adapted for executing a training algorithm on the special processing unit with the training data vectors having the highest available importance values of the earlier training round.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The proposed method—as well as the related system—for training of a machine learning model may offer multiple advantages and technical effects:

The method proposed here may enable a combined system of CPU and GPU working in cooperation to reduce the total time required for training of a linear machine learning model. The proposed method assumes that the one or more GPUs may only have access to a limited amount of memory, whereas the CPU may have access to a larger amount of memory than the GPU and that the training data set may fit into the CPU memory completely. In contrast to this, only a limited amount of the training data may fit into the memory of the GPU. Thus, the proposed method describes an effective approach to select training data vectors to be transferred from the CPU to the GPU by means of the CPU to determine a next better version of the machine learning model.

The machine learning model parameters may be sent back from the GPU to the CPU and used as input for the next training round of the machine learning model. In each round, the CPU may determine an importance factor for selected ones of training data vectors of the training data set, and based on the importance factor of the training data vectors a selection is made for training data vectors to be transferred from the CPU to the GPU—i.e., the related memory—for a next training round.

This way, both, the CPU and the GPU are processing tasks completely in parallel, whereas in the traditional approach, the CPU may be more or less idle, while the GPU is determining a next set of parameters for a next approximation step of a better machine learning model. Thus, a higher throughput and a shorter training time for a given training data set can be achieved. Hence, the available hardware resources are utilized in a better and more optimized way if compared to the state-of-the-art.

In the following, additional embodiments of the inventive concept will be described.

According to one preferred embodiment of the method, the importance value of a training data vector may be a result of a duality gap determination of the training data vector in light of training data set for the machine learning model. This way, always those training data vectors are used for next round of training of the machine learning model that may positively influence, i.e., improve, the model the most. The duality gap approach has been known by a skilled person in the field of applied mathematics, especially with optimization problems.

According to another preferred method, the importance value of the training data vectors may be determined—in particular, updated—for randomly identified training data vectors of the training data set. Thus, in each training round the training data vectors used—i.e., transferred to it—by the special processing unit may vary in a way that those training data vectors may be used by the special processing unit which may have the most effect on the machine learning model in the actual step.

According to one optional embodiment of the method, the special processing unit may have a higher processing throughput—i.e., more performance—than the general processing unit. This may typically be the case if GPUs may be used to accelerate the learning of a machine learning model. However, the proposed method may also work if the CPU may have a higher performance than a co-processing GPU.

Now, if the GPU has a higher performance than the CPU, it may happen that the GPU finishes its processing on the transferred set of training data vectors, whereas the CPU is not ready determining all importance values for the complete training data set—i.e., all training data vectors. In this case, the method may simply stop the calculation of the important values after the GPU signals that it has finished processing for a given set—i.e., the transferred training data vectors—of training data vectors.

According to one advantageous embodiment of the method, the special processing unit may be a graphic processing unit (GPU) or a field programmable gate array (FPGA). Other, similar special processing units may be used which may have a higher performance—in particular, vector performance—than the related CPU. Thus, the proposed method may be implemented with a variety of different special processing units. It may also be possible to partition the training data set and deploy a plurality of special processing units together with one CPU as general processing unit. In such a case, different aspects of the machine learning model may be processed on different special processing units.

According to an additionally preferred embodiment of the method, the amount of the special processing unit memory may be smaller than required for the training data set. Thus, the complete set of training data vectors would not fit into the special processing unit memory. However, it may fit into the general processing unit memory. Thus, the complete training data set may be available permanently to the CPU by means of its associated main memory. This way, training data vectors may be selected randomly in order to determine a related importance value without loading the training data vector from an external storage device and thus, slow down the overall performance.

According to one preferred embodiment of the method, only those training data vectors may be transferred from the general processing unit memory to the special processing unit memory only if they are not available in the special processing unit memory. Hence, no transfer time may be wasted by reloading already available training data vectors into the special processing unit.

According to a further preferred embodiment, the method may also comprise transferring back results of the executed training algorithm from the special processing unit to the general processing unit. This may be performed immediately after the special processing unit may have finished its processing on the received training data vectors. It may be advantageous that the special processing unit will not wait for the general processing unit to finish its importance value determination. Because the determination of importance values in the original training data set may happen for randomly selected training data vectors, this process may be interrupted anytime.

Only those training data vectors may be transferred to the memory of the special processing unit that fit into the memory of it and have the highest importance values. In case not new enough importance values may be determinable by the CPU in an actual training round, importance values from earlier training rounds may be used in addition to select appropriate trading data vectors to be transferred from the general processing unit memory to the special processing unit memory.

According to one permissive embodiment of the method, the graphic processing unit may finish a training algorithm execution using the dynamically transferred training data vectors before the general processing unit may have finished the determination of the importance values of all training data vectors. Thus, it may always be ensured that processing systems—in particular, the general processing unit and the special processing unit—work in parallel. Not any compute cycle may be wasted. The general processing unit simply stops its importance value determination if the typically much faster special processing unit has finished its next round of a machine learning model optimization.

According to one useful embodiment of the method, a random set of training data vectors may be transferred from the general processing unit to the graphic processing unit if no importance values are available for the training data vectors. This may be the case at the beginning of the proposed method. It may be understood that no importance values may exist for the training data vectors in the first round. No earlier training round does exist in which the required importance vectors may have been determined. Therefore, a random set of the training data set—i.e., random training data vectors—may be used for the first optimization for the machine learning model.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
Figure 1:
Figure 1:
Figure 1:
Figure 2:
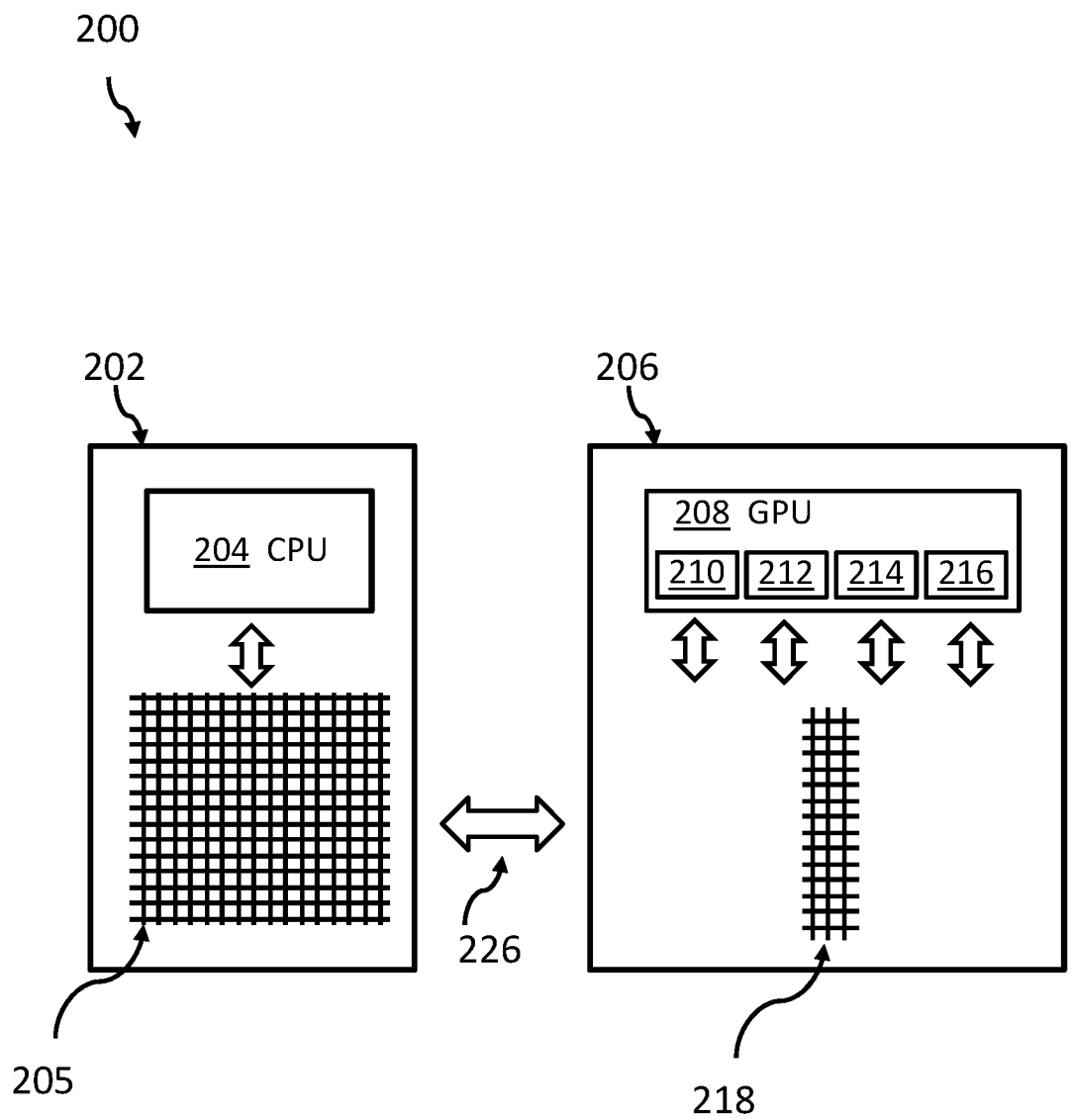
Figure 3:
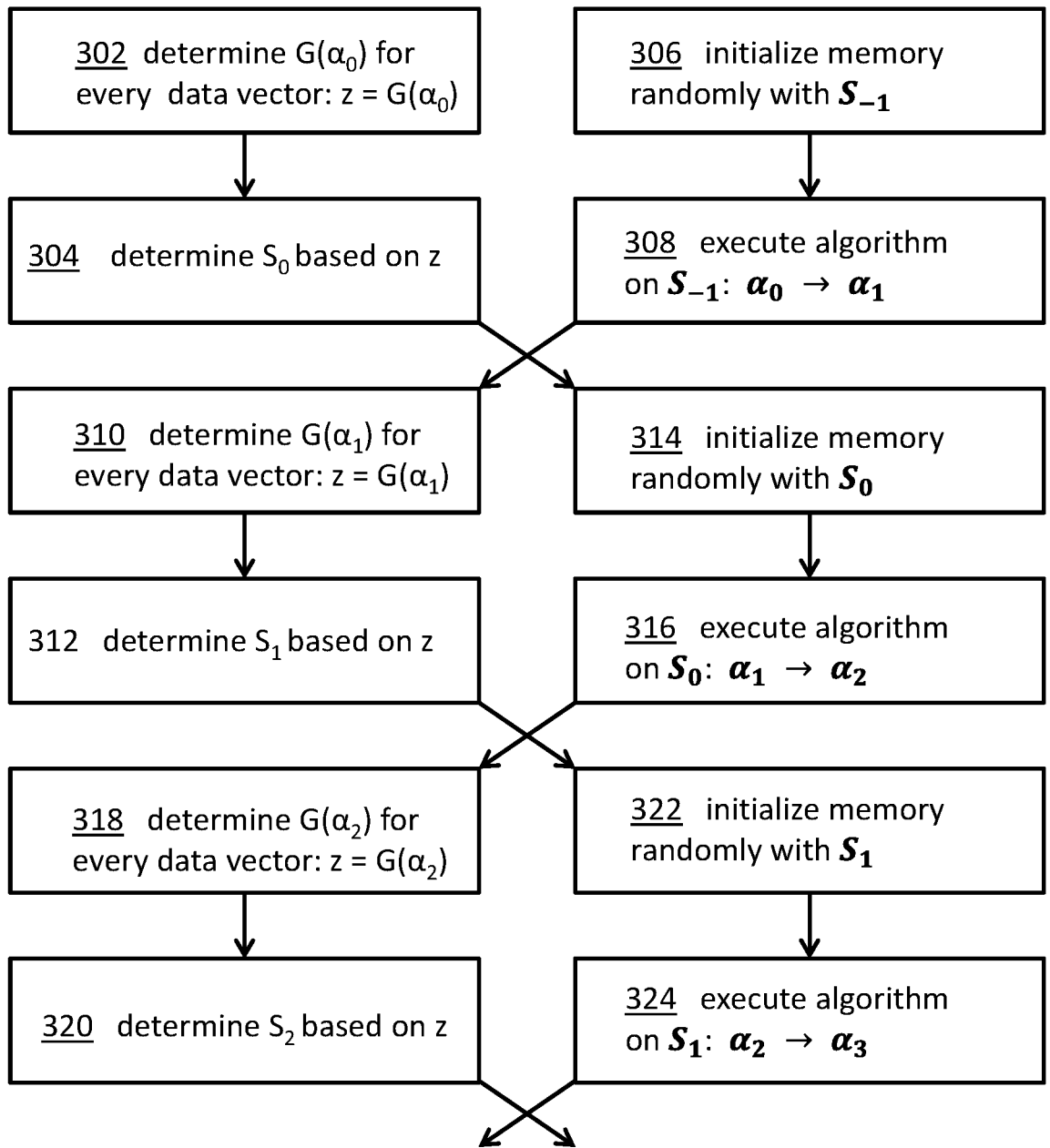
Figure 4:
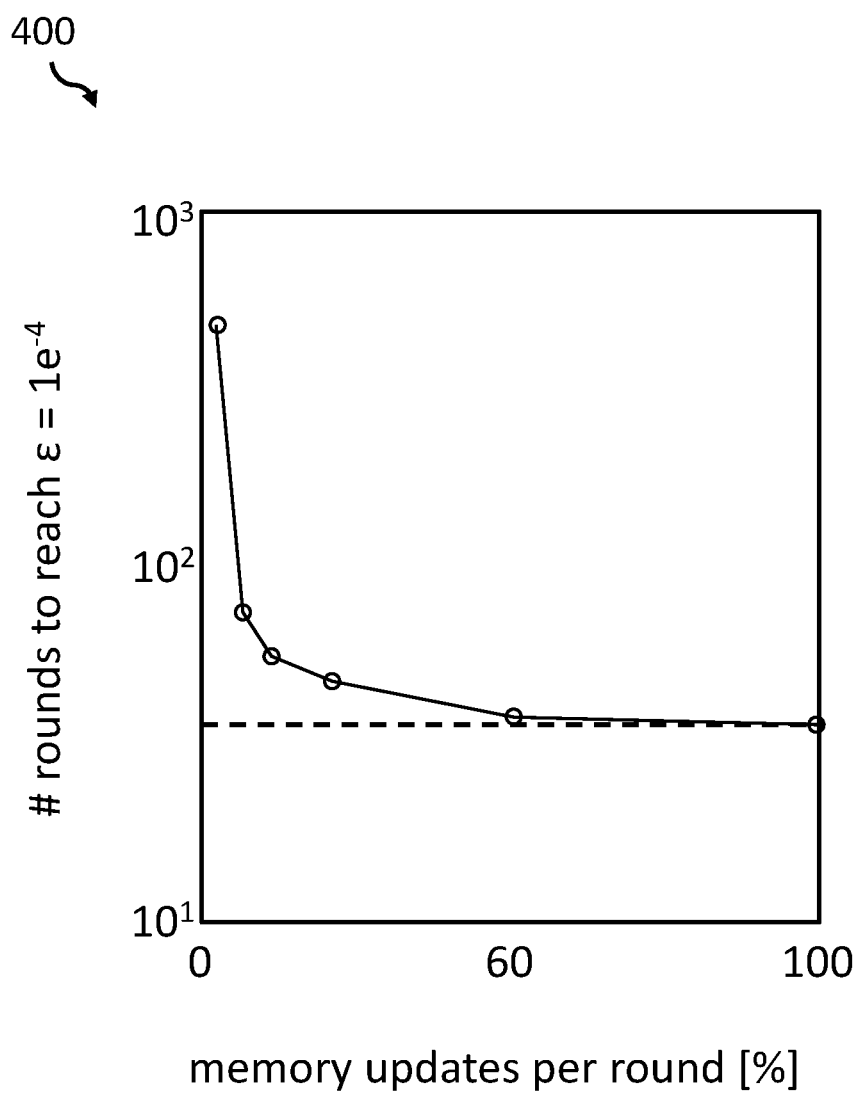
Figure 5:
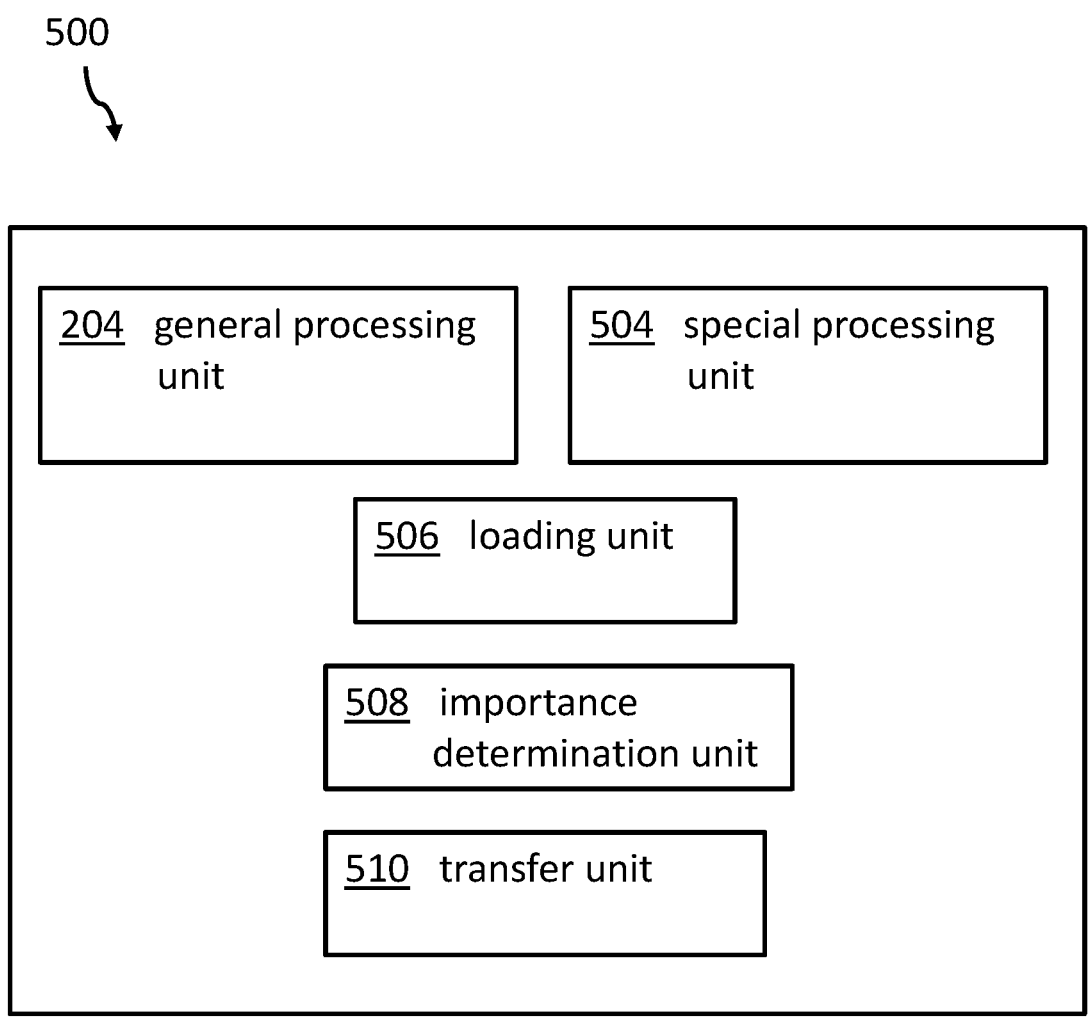
Figure 6:
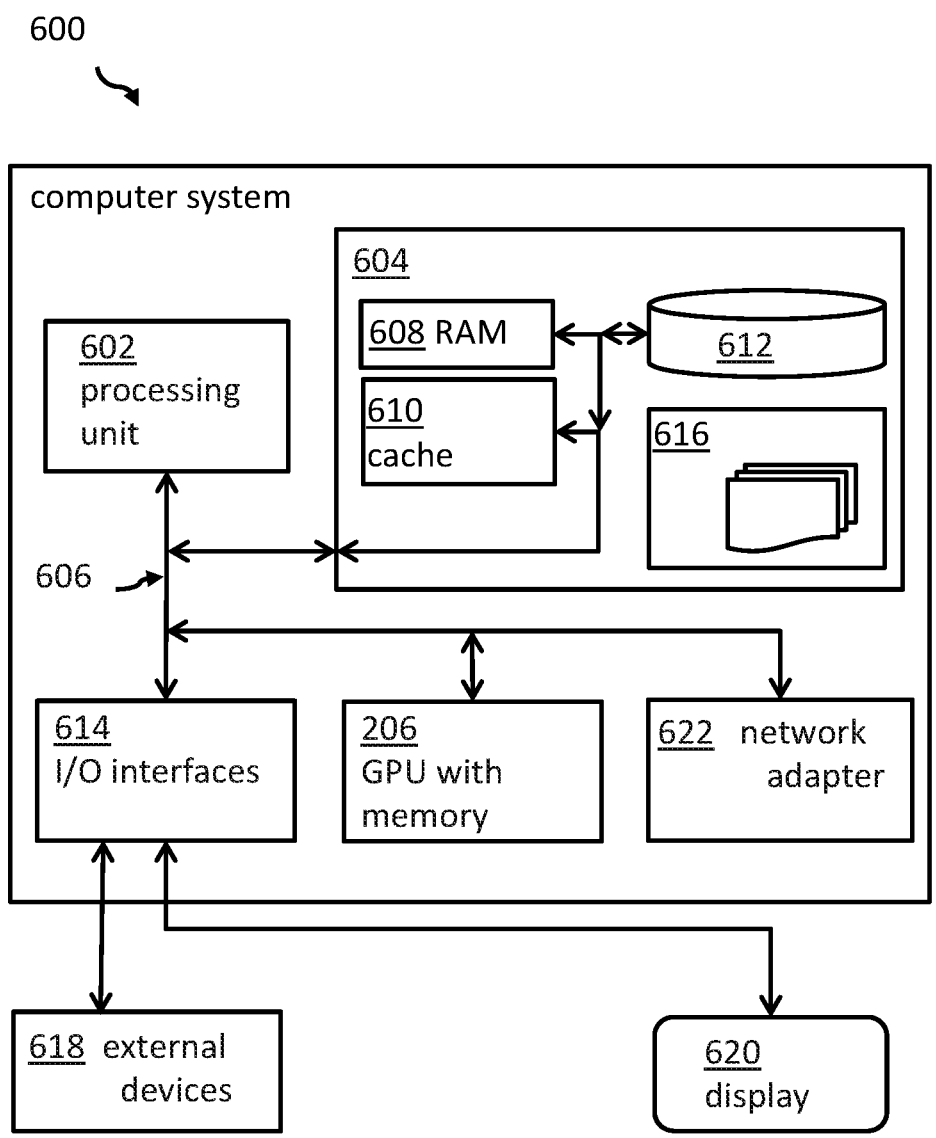

Preferred embodiments of the invention will be described, by way of example only, and with reference to the following drawings, wherein:

FIG. 1 shows a block diagram of an embodiment of the method for training of a machine learning model in a mixed environment comprising a CPU and a GPU;

FIG. 2 shows a block diagram of an embodiment of a CPU and a GPU together with accessible memory;

FIG. 3 shows a block diagram of a more detailed embodiment of the method for training for a machine learning model;

FIG. 4 shows simulated results of the proposed method if compared to theoretically achievable results;

FIG. 5 shows a block diagram of an embodiment of the system for training of the machine learning model; and FIG. 6 shows a block diagram of an embodiment of a computer system instrumental for executing the proposed method.

DETAILED DESCRIPTION

In the context of this description, the following conventions, terms and/or expressions may be used:

The term 'machine learning model' may relate to the field of machine learning which is a field of computer science that gives computer systems the ability to learn without being explicitly programmed, i.e., without procedural commands. In this context, the term 'machine learning model' may denote a mathematical model of a specific problem of interest. A training data set of training data vectors may be made available to a learning algorithm adjusting parameters of the model in a step-by-step approach. This way, the model is tuned in order to generate and predictive outcome based on a certain input stimulus.

The term 'general processing unit' may denote a processing unit adapted for executing basically all typically known instructions of a central processing unit (CPU). In contrast to general processing units, special purpose processing units are known, e.g., mathematical co-processors, security co-processors and also co-processing units optimized to handle graphical data, i.e., data to be displayed to a user. Such graphical processing units (GPU) may be compute units with good performance values when processing vectors of data. Such a vector data may also be used to train machine learning models.

The term 'special processing unit' may denote, in the context of this application, a processing unit with a more limited set of instructions if compared to a general processing unit and with less memory per processing core if compared to the general processing unit. Examples of these special processing units may be GPUs, as well as, FPGAs (field programmable gate arrays or similar special purpose processing units.

The term 'importance value' may denote a real or integer value describing an importance of a specific training data vector—sometimes also denotable as sample data—in an array of training data vectors with respect to advancing a machine learning model in an iterative process. One example of an importance value may be the contribution of individual training data vectors to the duality gap value which may be defined as the difference between the primary and the dual solution of a mathematical problem with optimization problems.

The term 'training data' may denote a plurality of training data vectors instrumental for training a machine learning model.

In the following, a detailed description of the figures will be given. All instructions in the figures are schematic. Firstly, a block diagram of an embodiment of the inventive method for training of a machine learning model is given. Afterwards, further embodiments, as well as embodiments of the system for training of a machine learning model, will be described.

FIG. 1 shows a block diagram of an embodiment of the method 100 for training of a machine learning model in a mixed environment comprising a CPU (as a representative of the general processing unit) and a GPU as an example of a special processing unit. The amount of general processing unit memory directly accessible by the general processing unit is larger than the amount of special processing unit memory directly accessible by the special processing unit.

The method comprises loading, 102, a complete training data set into the memory of the general processing unit and determining, 104, importance values relating to selected training data vectors in the provided training data set of the training data vectors.

Additionally, the method 100 comprises dynamically transferring, 106, training data vectors of the training data set from the general processing unit memory to a special processing unit memory using as decision criteria the importance value of the training data vector. The importance value used is taken from an earlier training round of the machine learning model. Hence, only those training data vectors having the highest importance value are transferred from CPU to GPU as long as the special processing unit memory has capacity to store them. As importance value, the model of duality gap values may be applied.

Last but not least, the method 100 comprises executing, 108, a training algorithm on the special processing unit with the training data vectors having the highest available importance values of one of the earlier training rounds.

The earlier may typically be the previous training round. However, that is not necessary. It may also well be that the importance value of a training data vector from a training round earlier than the previous training round may be used to determine which training data vector(s) to be transferred to the GPU/special processing unit if the CPU did not have enough time to calculate importance values for all training data vectors.

FIG. 2 shows a block diagram 200 of an embodiment of a computer system 202 with a CPU 204 and a GPU subsystem 206 together with accessible memory. It may be noted that the GPU subsystem 206 may be part of the same computing system comprising the CPU 204. Data may be exchanged between the memory 205 accessible by the CPU 204 and memory units of the GPU 208. The GPU 208 may comprise a plurality of computing cores 210, 212, 214, 216, and local special processing unit or GPU memory 218. The memory 218 may be shared between the cores 210, 212, 214, 216 of the GPU 208. Actually, the memory may be part of the GPU 208 itself, depending on the implementation.

It may also be noted that the available training data set may fit completely into the memory 205, accessible by the CPU 204, but not into the memory block 218 of the GPU 208. Data may be exchanged back and forth between the memory 205 and the memory blocks 218, which is indicated by the double arrow 226.

FIG. 3 shows a block diagram of a more detailed embodiment 300 of the method for training a machine learning model. The activities in the left side of the figure will be executed on the general processing unit 202, whereas the activities on the right side of the figure are executed by the special processing unit 206.

Firstly, duality gaps for a 0-th training round will be determined, 302, on which basis a 0-th selection $S_0$ of training data vectors is made, 304. In parallel, the special processing unit is initialized, 306, with a random set of training data vectors to perform an initial training round, 308, resulting in a first model iteration $\alpha_1$. This is then given back to the general processing unit to be used for the next round of duality gaps values, 310. In parallel, the memory of the special processing unit is initialized, 314, with the training data vectors determined in step 304 to execute, 316, a next training round. In step 312—executed in parallel by the general processing unit 202—a next set of training data vectors $S_1$ to be transferred to the special processing unit 206 is determined, 312. The process continues with the steps 318 and 320 on the general processing unit 202, while, in parallel, the steps 322 and 324 are executed on the special processing unit 206 in a comparable way as just described. This way is can be ensured that none of the two processing units 202 and 206 will idle in any time span. This enhances the usage of available resources significantly.

FIG. 4 shows a graphical representation 400 of simulated results of the proposed method 100 if compared to a theoretically achievable result. The dashed horizontal line assumes that all true duality values are known for each optimization round of the machine learning training. However, in the proposed method this is not the case. The round dots connected by solid lines represent simulated results for the number of rounds to reach an error factor $\varepsilon$ in the range of $e^{-4}$. Thus, the proposed method converges pretty fast, although not all importance values—e.g., duality get values for data vectors of the training model—are known from the previous learning round and older values are used for these training data vectors instead.

FIG. 5 shows a block diagram of an embodiment of the system 500 for training of the machine learning model. The system 500 comprises a general processing unit 204 and a special processing unit 208 (compare FIG. 2), wherein the amount of general processing unit memory (not shown), directly accessible by the general processing unit is larger than the amount of special processing unit memory (not shown) directly accessible by the special processing unit.

The system comprises also a loading unit 506 adapted for loading a complete training data set into the memory of the general processing unit, an 508 importance determination unit adapted for determining importance values for training data vectors in the provided training data set of the training data vectors, and a transfer unit 510 adapted for dynamically transferring training data vectors of the training data set from the general processing unit memory to a special processing unit memory using as decision criteria the importance value of the training data vector, wherein the importance value used is taken from an earlier training round of the machine learning model.

Thereby, the special processing unit 208 is adapted for executing a training algorithm on the special processing unit with the training data vectors having the highest available importance values of one of the earlier training rounds.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via input/output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, further components of the system for training of a machine learning model are attached to the bus system 606. This may include the special processing unit—e.g., in form of a GPU or FPGA—the loading unit 506, the importance determination unit 508 and the transfer unit 510.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a," "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for training of a machine learning model in a mixed environment comprising a general processing unit and a special processing unit, wherein an amount of general processing unit memory directly accessible by said general processing unit is larger, than an amount of special processing unit memory directly accessible by said special processing unit, said method comprising:
    loading a complete training data set into said general processing unit memory;
    determining importance values relating to training data vectors in said provided training data set of said training data vectors;
    dynamically transferring training data vectors of said training data set from said general processing unit memory to a special processing unit memory using as decision criteria said importance value of said training data vector, wherein said importance value used is taken from an earlier training round of said machine learning model; and
    executing a training algorithm on said special processing unit with said training data vectors having highest available importance values of one of said earlier training rounds.

2. The method according to claim 1, wherein said importance value of a training data vector is a result of a duality gap determination of said training data vector in light of training data set for a machine learning model.

3. The method according to claim 1, wherein said importance value of training data vectors is determined for randomly identified training data vectors of said training data set.

4. The method according to claim 1, wherein said special processing unit has a higher processing throughput than said general processing unit.

5. The method according to claim 1, wherein said special processing unit is a graphic processing unit or a field programmable gate array.

6. The method according to claim 1, wherein said amount of said special processing unit memory is smaller than required for said training data set.

7. The method according to claim 1, wherein only those training data vectors are transferred from said general processing unit memory to said special processing unit memory only if they are not available in said special processing unit memory.

8. The method according to claim 1, further comprising transferring back results of said executed training algorithm from said special processing unit to said general processing unit.

9. The method according to claim 1, wherein said graphic processing unit finishes a training algorithm using said dynamically transferred training data vectors before said general processing unit has finished said determination of said importance values of all training data vectors.

10. The method according to claim 1, wherein a random set of training data vectors is transferred from said general processing unit to said special processing unit if no importance values are available for said training data vectors.

11. A system for training of a machine learning model, said system comprising a general processing unit and a special processing unit, wherein an amount of general processing unit memory directly accessible by said general processing unit is larger than an amount of special processing unit memory directly accessible by said special processing unit, said system comprising:
- a loading unit adapted for loading a complete training data set into said general processing unit memory;
- an importance determination unit adapted for determining importance values relating to training data vectors in said provided training data set of said training data vectors;
- a transfer unit adapted for dynamically transferring training data vectors of said training data set from said general processing unit memory to a special processing unit memory using as decision criteria said importance value of said training data vector, wherein said importance value used is taken from an earlier training round of said machine learning model; and
- wherein said special processing unit is adapted for executing a training algorithm on said special processing unit with said training data vectors having said highest available importance values of one of said earlier training round.

12. The system according to claim 11, wherein said importance determination unit is adapted for determining said importance value of a training data vector as a result of a duality gap determination of said training data vector in light of training data set for a machine learning model.

13. The system according to claim 11, wherein said importance determination unit is adapted for randomly selecting training data vectors for determining a related importance value.

14. The system according to claim 11, wherein said special processing unit has a higher processing throughput than said general processing unit.

15. The system according to claim 11, wherein said special processing unit is a graphic processing unit or a field programmable gate array.

16. The system according to claim 11, wherein a storage capacity of said special processing unit memory is smaller than required for the training data set.

17. The system according to claim 11, wherein said transfer unit is adapted for only transferring those training data vectors from said general processing unit memory to said special processing unit memory only if they are not available in said special processing unit memory.

18. The system according to claim 11, further comprising:
- a transferring back unit adapted for transferring back results of said executed training algorithm from said special processing unit to said general processing unit.

19. The system according to claim 11, wherein said special processing unit is adapted to finish a training algorithm using said dynamically transferred training data vectors before said determination of said importance values of all training data vectors is performed by said general processing unit.

20. A computer program product for training of a machine learning model in a mixed environment comprising a general processing unit and a special processing unit, wherein an amount of general processing unit memory, directly accessible by said general processing unit, is larger than an amount of special processing unit memory directly accessible by said special processing unit, said computer program product comprising a computer readable storage medium having program instructions embodied therewith, said program instructions being executable by one or more computing systems to cause said one or more computing systems:
- to load a complete training data set into said general processing unit memory;
- to determine importance values relating to training data vectors in said provided training data set of said training data vectors;
- to transfer dynamically training data vectors of said training data set from said general processing unit memory to a special processing unit memory using as decision criteria said importance value of said training data vector, wherein said importance value used is taken from an earlier training round of said machine learning model; and
- to execute a training algorithm on said special processing unit with said training data vectors having highest available importance values of one of the earlier training rounds.

* * * * *